May 8, 1956  F. R. KLEIMAN  2,744,767

BALL AND SOCKET TYPE HITCH

Filed Jan. 9, 1953

INVENTOR
Floyd R. Kleiman
BY A. Hiram Sturges
ATTORNEY

United States Patent Office 2,744,767
Patented May 8, 1956

2,744,767

BALL AND SOCKET TYPE HITCH

Floyd R. Kleiman, Lincoln, Nebr.

Application January 9, 1953, Serial No. 330,504

2 Claims. (Cl. 280—512)

This invention relates to an improvement in trailer couplings of the ball and socket type, and particularly those which are used in situations in which a quick coupling of the trailer hitch is important.

There are many situations in which a quick coupling and uncoupling of a trailer hitch is very important. For example, the use of trailer hitches of this type is common in the field of farm equipment where it is necessary to quickly make frequent changes in the attaching of one machine to another. The most common hitches now in use require the operator to dismount from his machine and go through many motions of unscrewing of parts and sometimes even to use special tools to disconnect implement from tractor.

It is therefore a primary object of this invention to provide a trailer coupling which can be easily and readily connected and disconnected and yet a trailer coupling in which the operative parts are formed of relatively heavy and strong material.

A particular object of the invention is to provide a trailer coupling which can be pushed downwardly over the ball portion and which will then automatically adjust itself into locked position.

A further object is to provide a trailer hitch as described which can be easily placed on the ball without exertion.

Yet a further object is to provide a trailer hitch having two safety features, a lock portion and a latch portion, the two being so constructed that they must be both released before the coupling can be uncoupled from the ball.

A further object is to provide a trailer hitch which can be disconnected with one hand of the operator which is of particular value when the operator is holding other things with his other hand.

The particular object of the invention is to provide a quickly connected and disconnected hitch which is safe and dependable.

Yet another object of the invention is to provide a device for the purpose described which is sturdy and durable in construction, reliable and efficient in operation, and relatively simple and inexpensive to manufacture, assemble and utilize.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by this skilled in the art without departing from the present invention and the purview of the appended claims.

Figure 2:
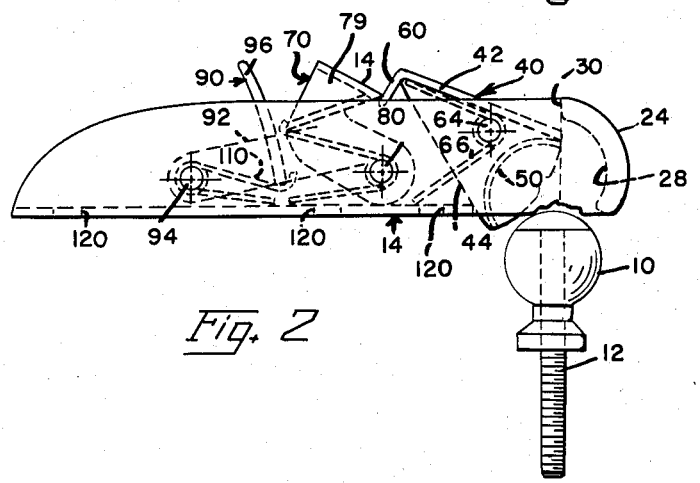
Figure 2 is a side elevation of the hitch of this invention shown with the various parts of the socket portion and its frame in positions for receiving the ball and in the position they are in just prior to the attachment of the socket portion to the ball portion.

The trailer hitch of this invention is of the ball and socket type, the ball portion 10 being best seen in Figure 2. The ball 10 has an attachment shank 12 at the lower end thereof which is threaded, as is customary.

The upper portion of the hitch includes a substantially U-shaped frame member 14. The frame member 14 has a bottom 16 best seen in Figure 3 and has two parallel side portions 20 which extend vertically upwardly and which are preferably integrally connected to the bottom 16.

The frame member 14 is of elongated shape and the side portions 20 are spaced apart a relatively short distance with respect to the length of the frame member from end to end. At the forward end of the frame member a forward half-socket portion 24 is provided. The half socket portion 24 has a concave inward or rearward surface which can be seen in dotted lines at 28 in Figure 1 and in Figure 2.

The forward half-socket portion 24 extends from a point indicated at 30 above the approximate center of the ball and to a point disposed a little past the plane of horizontal center of the ball 10 whereby the forward half-socket portion 24 tends to grip around the undersurface of the ball slightly. The forward half-socket portion 24 is rigidly secured to the side portions 20 and the frame 14 is open a substantial distance directly behind the forward half-socket portion 24 on the under side of the frame. Behind the open space which is bounded on its forward side by the bottom of the half-socket 24 and which is bounded on its rearward side by the forward edge of the bottom frame section 16, is a rearward half-socket member generally indicated at 40.

The rearward half-socket member 40 has an upper portion 42 provided with an upper horizontal surface and also has two downwardly extending vertical portions connected to the upper portions 42 at the sides of the latter. One of the downwardly extending vertical portions 44 can be seen in full line view at 44 in Figure 1.

The rearward half-socket holding member 40 has a concave forward surface 50, providing, when the rearward half-socket member is in a hitching position, a substantially spherical ball-receiving cavity together with and in cooperation with the concave rearward surface of the forward half-socket portion 28.

The rearward half-socket member 40 has an upper forward portion, the lower part of which forms the upper portion of the concave forward surface 50. This upper forward portion, when all parts are in a hitching position, extends a substantial distance forwardly of the rearward end of the ball and extends forwardly to a point substantially directly above the center of the ball.

At the rearward end of the upper horizontal surface 42, a downwardly extending portion 60 is provided and attached to the portion 42, the portion 60 being for a purpose later described.

The rearward half-socket member 40 is pivotally mounted about a pivot-pin 64 which extends horizontally through the side members 20 of the frame 14 and which extends through the vertical side portions 44 of the member 40.

Figure 1:
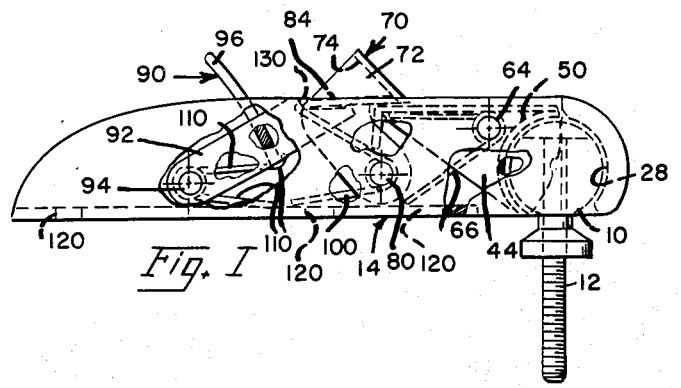
Figure 1 is a side elevation of the trailer hitch of this invention shown with its socket portion attached to its ball portion for operation, certain parts being broken away for illustration.

A spring, shown in broken line at 66 in Figure 1 at a point between adjacent part of a rearward half socket holding portion side member 44 and the edge of a broken away portion, extends from the bottom 16 of the frame 14 upwardly and loops around the pin 64, then extends rearwardly under the underside of the portion 42 of the member 40 for pushing upwardly thereon.

Behind the rearward half-socket holding member 40 is a latch 70 which has two vertical side portions 72 which latter extend vertically downwardly from a transverse interconnecting web 74 which latter normally slants downwardly and forwardly at its lower end when in an operative position as best seen in Figure 1.

The vertical side portions 72 of the member 70 extend rearwardly then forwardly in an approximate L-shape, and the lower ends thereof are rounded for clearance from the bottom 16 of the frame.

The sides 72 are pivotally mounted about a second horizontal pin 80 which extend through the side members 20 of the frame whereby the latch member 70 swings about the horizontal axis.

The latch member 70 further has a horizontal web 84 which extends between the sides 72 and is secured thereto, the web 84 being also secured to the first or upper web 74.

The web 84 is engaged on its under side by a lock member which latter is generally indicated by the numeral 90. The lock member 90 has two side portions 92 which are disposed in spaced apart parallelism and which are vertically disposed and which are disposed along the inner sides of the side frame members 20, being secured thereto by a third pivot pin 94 which latter extends horizontally through the side members 20 and through the vertical pieces 92 adjacent the lower side of the frame 14.

The lock member 90 has a handle portion 96 which has its lower end disposed between and secured to the side members 92 and which extends at its upper end upwardly and rearwardly when in a normal position as seen in Figure 1. The purpose of the handle 96 is to make it possible for an operator to push forwardly on the rearward side of the handle 96 for causing the lock member 90 to pivot forwardly and downwardly.

When the lock member 90 pivots forwardly and downwardly the upper edges of its side portions 92 move downwardly from the under side of the lower web 84 and this permits the latch member 70 to move rearwardly and downwardly. The preferred way is for an operator to grip with his hand and particularly his forefingers the forward surface of the upper end of the latch member 70 pushing it rearwardly and at the same time with his thumb pushnig forwardly on the rear side of the handle 96. This action releases the rear half-socket holding member 40 whereby it can swing upwardly at its rearward end under the influence of the spring 66 for releasing the ball as shown in Figure 2.

Figure 3:
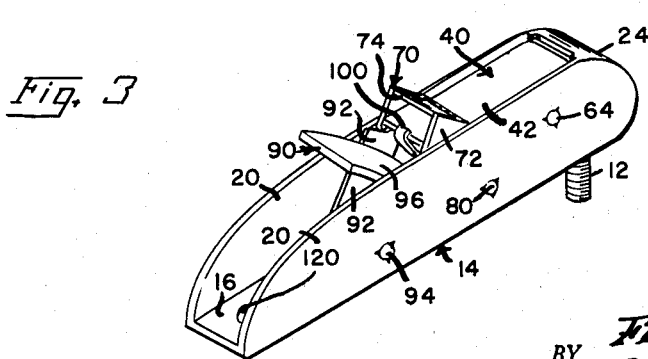
Figure 3 is a perspective view of the hitch as seen from the side and rear.

The mechanism works best if a second spring 100 is disposed extending in a loop around the second pin 80 from a point rearwardly thereof and engaging the bottom 16 of the frame and extending from the pin 80 upwardly to the rearward edge of the lower web 84 of the latch member 70. There the rearward end of the spring 100 hooks around the rearward edge of the web 84 as best seen in Figure 3.

Also, the rearward latch 90 has a spring 110, best seen in full lines in Figure 1. The spring 110 extends from a point on the bottom 16 of the frame at a point forwardly of the rearward pin 94 and loops about the pin 94 and then extends forwardly and upwardly, when in normal position, to hook about the lower edge of the handle member 96 of the latch 90 as best seen in Figure 1.

The bottom member 16 of the frame is preferably provided with a plurality of apertures 120 therethrough which are for the purpose of attaching the frame member 14 to the towing tongue of a trailer.

It will be seen that this invention has provided a trailer hitch which can be quickly attached to the ball by simply bringing the hitch downwardly on the ball whereby, as shown in Figure 2, the ball will strike the rearward half-socket member 50, causing the member 40 to pivot downwardly until its rearward end is caught by the latch member 70. The latch member 70 in turn moves upwardly until the lock member 90 locks into place by the engaging of the underside of the lower web 84 of the member 70 by the upper ends of the side members 92 of the lock member 90 which receives the web 84 in a recess 130. The recess 130 has a horizontal lower wall when seen in normal position as in Figure 1 and has an upwardly extending rearward wall which engages the rearward side of the web 84 and prevents the member 70 from pivoting rearwardly.

From the foregoing description, it is thought to be obvious that a trailer hitch constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a trailer hitch of the spherical ball and socket type: a ball, a frame having forward and rearward ends, a forward half-socket portion rigidly secured to said frame at the forward end of said frame, a rearward half-socket member retaining said ball in operation from moving rearwardly of said hitch, said rearward half-socket member having a concave forward surface providing, when in a hitching position, a substantially spherical ball cavity together with and in cooperation with the concave rearward surface of said forward half-socket portion, said rearward half-socket member having an upper forward portion disposed, when all parts are in a hitching position, a substantial distance forwardly of the rearward portion of said ball and extending forwardly to a point substantially above the center of said cavity, means pivotally mounting said rearward half-socket member on said frame for rotation about an axis disposed behind the concave forward surface of said rearward half-socket member said axis being transverse to the forward-to-rearward length of said frame and disposed above a plane extending horizontally through the center of the said ball cavity, whereby a placing of the forward half-socket portion and the rearward half-socket member on said ball causes said rearward half-socket member to rotate automatically into a hitching position under upward pressure from said ball on the said upper forward portion of said rearward half-socket member, and whereby a releasing rotation of said rearward half-socket member downwardly at its forward end will permit release of said ball, and means for releasably holding said rearward half-socket member in a hitching position, said rearward half-socket holding member having a latch-receiving upper rearward surface, a latch disposed behind said rearward half-socket member, said latch having a portion adapted to overlap and engage the latch-receiving surface of said rearward half-socket member, said latch member being pivotally connected to said frame member for rotation about an axis parallel to the pivot axis of said rearward half-socket member, said latch member having an upwardly extending surface adapted to be manually pressed to force the upper end of said latch member downwardly and rearwardly, and in which a spring is provided in a position pressing against said frame member and against said latch member respectively for causing said latch member to rotate into a position disposed forwardly at its upper end for engaging the latch-receiving surface of said rearward half-socket member.

2. In a trailer hitch of the spherical ball and socket type: a ball, a frame having forward and rearward ends, a forward half-socket portion rigidly secured to said frame at the forward end of said frame, a rearward half-socket member retaining said ball in operation from moving rearwardly of said hitch, said rearward half-socket member having a concave forward surface providing, when in a hitching position, a substantially spherical ball cavity together with and in cooperation with the concave rearward surface of said forward half-socket portion, said rearward half-socket member having an upper forward portion disposed, when all parts are in a hitching position, a substantial distance forwardly of the rearward portion of said ball and extending forwardly to a point substantially above the center of said cavity, means pivotally mounting said rearward half-socket member on said frame for rotation about an axis disposed behind the concave forward surface of said rearward half-socket member transverse to the forward-to-rearward length of said frame and disposed above a plane extending horizontally through the center of the said ball cavity, whereby a placing of the forward half-socket portion and the rearward half-socket member on said ball causes said rearward half-socket member to rotate automatically into a hitching position under upward pressure from said ball on the said upper forward portion of said rearward half-socket member, and whereby a releasing rotation of said rearward half-socket member downwardly at its forward end will permit release of said ball, and means for releasably holding said rearward half-socket member in a hitching position, said rearward half-socket holding member having a latch-receiving upper rearward surface, a latch disposed behind said rearward half-socket member, said latch having a portion adapted to overlap and engage the latch-receiving surface of said rearward half-socket member, said latch member being pivotally connected to said frame member for rotation about an axis parallel to the pivot axis of said rearward half-socket member, said latch member having an upwardly extending surface adapted to be manually pressed to force the upper end of said latch downwardly and rearwardly, and in which a spring is provided in a position pressing against said frame member and against said latch member respectively for causing said latch member to rotate into a position disposed forwardly at its upper end for engaging the latch-receiving surface of said rearward half-socket member, and in which said latch member has a lock-receiving downwardly facing rearward surface and a lock member disposed on the rearward side of said latch member, said lock member being pivotally secured to said frame for rotation about an axis parallel to said latch member and having a portion for engaging said lock-receiving surface of said latch member to prevent rotation of the upper end of said latch member rearwardly, and spring means for holding the forward end of said lock member upwardly and in locking engagement with said latch member, and said lock member having a handle portion protruding upwardly therefrom and for facilitating manual rotation thereof.

References Cited in the file of this patent

UNITED STATES PATENTS

| | | |
|---|---|---|
| 1,254,199 | Brice | Jan. 22, 1918 |
| 1,408,501 | Clement | Mar. 7, 1922 |
| 1,757,009 | Dumond | May 6, 1930 |
| 2,061,234 | Hoflich | Nov. 17, 1936 |
| 2,070,884 | Claus | Feb. 16, 1937 |
| 2,125,611 | Hennicke | Aug. 2, 1938 |
| 2,130,705 | Radeleff | Sept. 20, 1938 |
| 2,399,746 | Klaus et al. | May 7, 1946 |
| 2,459,448 | Murray | Jan. 18, 1949 |